(12) United States Patent
Iida et al.

(10) Patent No.: US 6,443,502 B1
(45) Date of Patent: Sep. 3, 2002

(54) LEAKAGE RESTRICTION DEVICE FOR REFRIGERATION CYCLE

(75) Inventors: Arata Iida, Toyota; Hiroyuki Wakabayashi, Kariya, both of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/549,319

(22) Filed: Apr. 13, 2000

(30) Foreign Application Priority Data

Apr. 22, 1999 (JP) .......................................... 11-114413

(51) Int. Cl.[7] ................................................ F16L 17/00
(52) U.S. Cl. .................... 285/351; 285/124.1; 285/910; 285/918; 277/910; 277/650
(58) Field of Search ............................ 285/124.1, 124.5, 285/351, 910, 918; 277/638, 650, 651, 652, 653, 654, 910

(56) References Cited

U.S. PATENT DOCUMENTS

| 3,667,524 A | | 6/1972 | Wittren et al. | |
|---|---|---|---|---|
| 3,788,654 A | * | 1/1974 | Mandley | 277/652 |
| 5,342,095 A | * | 8/1994 | Klinger et al. | 285/351 |
| 5,551,707 A | * | 9/1996 | Pauley et al. | 277/910 |
| 5,803,512 A | | 9/1998 | Hollnagel | |
| 6,106,030 A | * | 8/2000 | Nader et al. | 277/652 |
| 6,189,322 B1 | * | 2/2001 | Ishihara et al. | 62/114 |
| 6,260,851 B1 | * | 7/2001 | Baron | 277/603 |

FOREIGN PATENT DOCUMENTS

| DE | 196 52 228 | 6/1998 |
|---|---|---|
| EP | 0 693 667 | 1/1996 |
| JP | A-130926 | 5/1995 |
| JP | A-7-130926 | 5/1995 |

* cited by examiner

*Primary Examiner*—Lynne H. Browne
*Assistant Examiner*—Aaron Dunwoody
(74) *Attorney, Agent, or Firm*—Harness, Dickey & Pierce, PLC

(57) ABSTRACT

A leakage restriction device for a refrigeration cycle of a vehicle air conditioner in which refrigerant flows has first and second rubber gaskets. The first and second gaskets are disposed between a pipe and a pipe joint of the refrigeration cycle for restricting refrigerant from leaking into atmospheric air. The first gasket is disposed on an atmospheric-air side and the second gasket is disposed on a refrigerant side between the pipe and the pipe joint. The first gasket has a gas permeability lower than that of the second gasket, and has a blistering-resistance which is inferior to that of the second gasket. As a result, refrigerant is restricted from leaking into atmospheric air, and a blister is restricted from being formed in the first and second gaskets even when a pressure of refrigerant is rapidly changed.

13 Claims, 8 Drawing Sheets

LEAKAGE RESTRICTION DEVICE FOR REFRIGERATION CYCLE

CROSS REFERENCE TO RELATED APPLICATIONS

This application relates to and claims priority from Japanese Patent Application No. 11-114413 filed on Apr. 22, 1999.

BACKGROUND OF THE INVENTION

1. Field of the Invention

The present invention relates generally to refrigeration cycles, and particularly to a leakage restriction device for a refrigeration cycle. The leakage restriction device has plural leakage restriction members disposed in a pipe connection portion of the refrigeration cycle for restricting refrigerant flowing through the refrigeration cycle from leaking into atmospheric air.

2. Related Art

Conventionally, a leakage restriction device for a refrigeration cycle has a rubber gasket such as an O-ring disposed in a pipe connection portion of the refrigeration cycle. The rubber gasket prevents refrigerant flowing through the refrigeration cycle from leaking into atmospheric air from the pipe connection portion. The rubber gasket is made of rubber to facilitate assemble and service of the gasket, or is made of rubber and metal or rubber and resin.

Recently, environmental protection is emphasized globally, and an amount of refrigerant gas such as chlorofluorocarbon and carbon dioxide leaking into atmospheric air from a refrigeration cycle is urged to be reduced. To provide a solution for this demand, lowering a gas permeability of the rubber gasket has been studied to restrict refrigerant gas from passing through the rubber gasket to leak into atmospheric air.

However, when a gas permeability of the rubber gasket is lowered to further restrict refrigerant gas from leaking into atmospheric air, a blistering-resistance of the rubber gasket for restricting a blister from being formed in the rubber gasket may be lowered. That is, when the gas permeability of the rubber gasket is lowered, refrigerant gas having entered the rubber gasket when atmospheric air surrounding the rubber gasket has a relatively high pressure may not be drained from the rubber gasket even when the pressure of the atmospheric air is decreased. Therefore, refrigerant gas having a pressure higher than that of the atmospheric air may stay inside the rubber gasket and cause a blister or a crack in the rubber gasket. Thus, it is difficult to provide a rubber gasket which sufficiently restricts refrigerant from leaking into atmospheric air while restricting a blister from being formed therein.

SUMMARY OF THE INVENTION

In view of the foregoing problems, it is an object of the present invention to provide a leakage restriction device for a refrigeration cycle having plural leakage restriction members, which restricts refrigerant flowing through the refrigeration cycle from leaking into air while restricting the leakage restriction members from having a blister.

According to the present invention, a leakage restriction device for a refrigeration cycle through which refrigerant flows has a first leakage restriction member and a second leakage restriction member. The refrigeration cycle has a pipe connection portion at which refrigerant pipes are connected. The pipe connection portion is disposed in an air. The first leakage restriction member is disposed on an air side in the pipe connection portion for restricting refrigerant from leaking into atmospheric air. The second leakage restriction member is disposed on a refrigerant side in the pipe connection portion for restricting refrigerant from leaking into atmospheric air. The first leakage restriction member has a gas permeability lower than that of the second leakage restriction member, and has a blistering-resistance which is inferior to that of the second leakage restriction member.

Since the first leakage restriction member has a relatively low gas permeability, refrigerant is restricted from leaking into the air through the first leakage restriction member. Since the second leakage restriction has a relatively high blistering-resistance, the second leakage restriction does not form a blister even when a pressure of refrigerant is rapidly reduced. Further, a pressure of refrigerant between the first and second leakage restriction members does not change rapidly even when a pressure of refrigerant at a refrigerant side of the second leakage restriction member is rapidly reduced. Therefore, even when the pressure of refrigerant is rapidly reduced, a blister is not formed in the first leakage restriction member. As a result, refrigerant is sufficiently restricted from leaking into air from the pipe connection portion, while a blister is restricted from being formed in the first and second leakage restriction members.

BRIEF DESCRIPTION OF THE DRAWINGS

This and other objects and features of the present invention will become more readily apparent from a better understanding of the preferred embodiments described below with reference to the accompanying drawings, in which.

DETAILED DESCRIPTION OF THE PREFERRED EMBODIMENTS

Preferred embodiments of the present invention are described hereinafter with reference to the accompanying drawings.

(First Embodiment)

Figure 1:
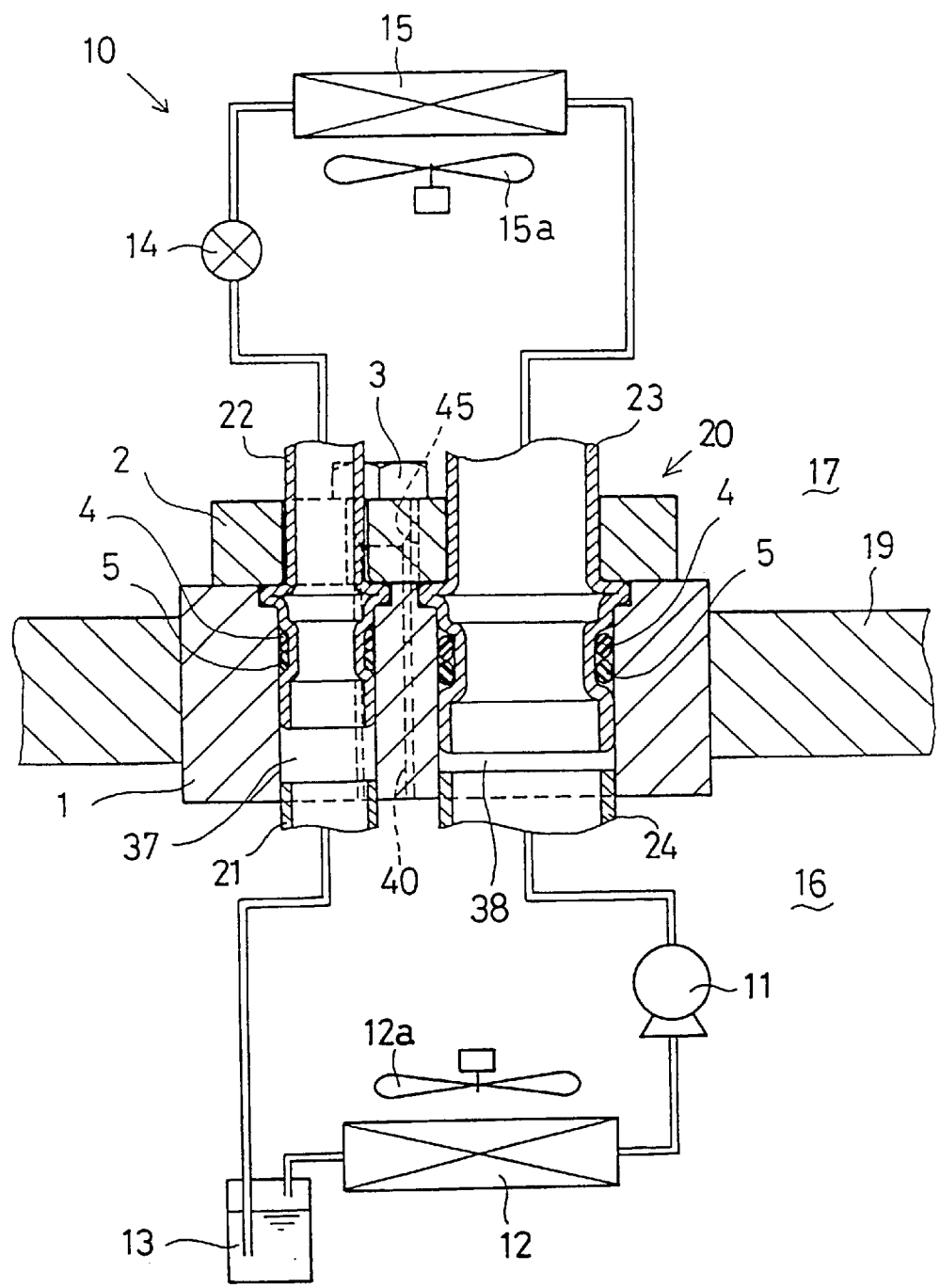
FIG. 1 is a partial sectional view showing a refrigeration cycle according to a first preferred embodiment of the present invention.

A first preferred embodiment of the present invention will be described with reference to FIGS. 1–3D. As shown in FIG. 1, a refrigeration cycle 10 for a vehicle air conditioner controls a temperature of air in a passenger compartment 17 of a vehicle. The refrigeration cycle 10 mainly cools air in the passenger compartment 17. A dashboard 19 separates the passenger compartment 17 from an engine compartment 16 of the vehicle in which an engine (not shown) is disposed.

The refrigeration cycle 10 includes a compressor 11, a condenser 12, a separator 13, an expansion valve 14, an evaporator 15 and a pipe joint 20. The compressor 11 is driven by the engine through a belt (not shown) to compress refrigerant. The condenser 12 condenses and liquefies refrigerant gas discharged from the compressor 11. The separator 13 separates refrigerant coming from the condenser 12 into gas refrigerant and liquid refrigerant, and tentatively stores the liquid refrigerant therein. The expansion valve 14 decompresses the liquid refrigerant coming from the separator 13. The evaporator 15 evaporates refrigerant discharged from the expansion valve 14. The refrigeration cycle 10 also has a cooling fan 12a and a blower fan 15a.

The pipe joint 20 is mounted in the dashboard 19 and air-tightly connects a pipe 21 communicating with an outlet of the separator 13 and a pipe 22 communicating with an inlet of the expansion valve 14. The pipe joint 20 also air-tightly connects a pipe 23 communicating with an outlet of the evaporator 15 and a pipe 24 communicating with an inlet of the compressor 11. The pipe joint 20 has a mounting block 1 mounted in the dashboard 19, a mounting plate 2 fastened to the mounting block 1 by a fastening bolt 3 and plural first and second rubber gaskets 4 and 5 for restricting liquid or gas refrigerant from leaking into atmospheric air.

The pipe 21 is a cylindrical metal pipe which connects the outlet of the separator 13 to an inlet of the pipe 22 in a high-pressure area of the refrigeration cycle 10. The pipe 22 is a cylindrical metal pipe which connects an outlet of the pipe 21 to the inlet of the expansion valve 14 in the high-pressure area of the refrigeration cycle 10. The pipe 23 is a cylindrical metal pipe having a radius larger than that of the pipe 22. The pipe 23 connects the outlet of the evaporator 15 to an inlet of the pipe 24 in a low-pressure area of the refrigeration cycle 10. The pipe 24 is a cylindrical metal pipe having a radius larger than that of the pipe 21. The pipe 24 connects an outlet of the pipe 23 to the inlet of the compressor 11 in the low-pressure area of the refrigeration cycle 10. Each of the pipes 21, 24 may be a rubber hose made of chlorinated butyl rubber added with nylon, nitrile butadiene rubber and so on.

Figure 2:
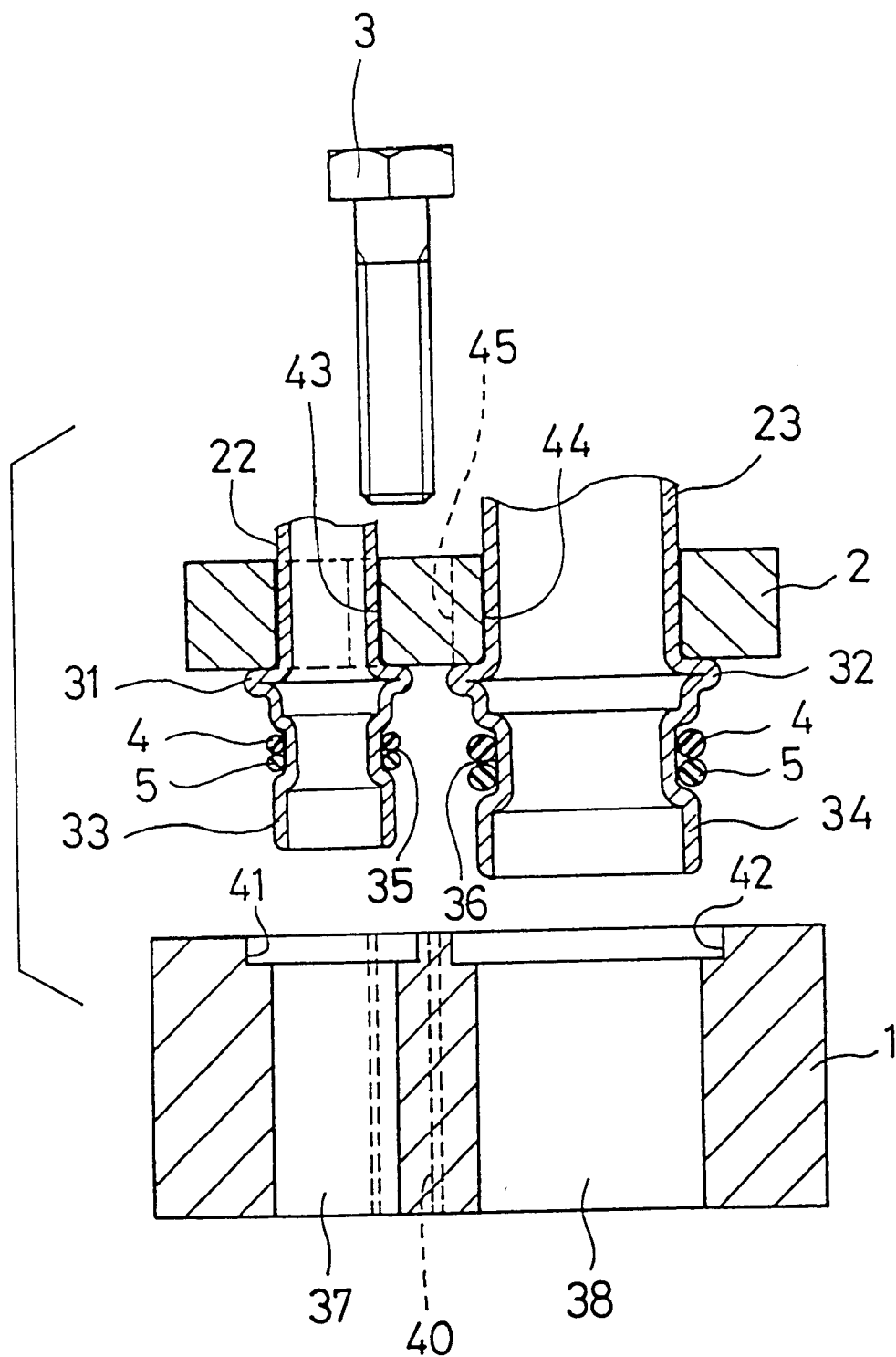
FIG. 2 is an exploded sectional view showing a pipe joint of the refrigeration cycle according to the first embodiment.

As shown in FIG. 2, the pipes 22, 23 disposed in the passenger compartment 17 respectively have annular flange portions 31, 32 formed by pressing to protrude outwardly in radial directions of the pipes 22, 23. The pipes 22, 23 also respectively have insertion portions 33, 34 extending from the flange portions 31, 32 to ends of the pipes 22, 23. The insertion portions 33, 34 respectively have annular recessed portions 35, 36 formed along outer circumferential surfaces thereof. The first and second gaskets 4, 5 are mounted in the recessed portions 35, 36, respectively.

The mounting block 1 is integrally formed into a rectangular parallelepiped using metal or resin, and is secured in a hole formed in the dashboard 19 through a sealing member (not shown) such as a rubber packing. The mounting block 1 has through holes 37, 38 and a threaded hole 40. The insertion portions 33, 34 of the pipes 22, 23 are respectively inserted into the through holes 37, 38. Annular engaging grooves 41, 42 are respectively formed at one ends (i.e., upper ends in FIG. 2) of the through holes 37, 38. When the pipes 22, 23 are respectively inserted into the through holes 37, 38, the flange portions 31, 32 are respectively fit into the engaging grooves 41, 42. One ends of the pipes 21, 24 are respectively inserted into the through holes 37, 38 from the other ends (i.e., lower ends in FIG. 2) of the through holes 37, 38, and are respectively welded to the other ends of the through holes 37, 38.

The mounting plate 2 is integrally formed into a predetermined shape using metal or resin. The mounting plate 2 has through holes 43, 44 and an insertion hole 45. The pipes 22, 23 are respectively inserted through the through holes 43, 44 to be inserted into the through holes 37, 38. The fastening bolt 3 is inserted through the insertion hole 45 and screwed into the threaded hole 40 in the mounting block 1, thereby fastening the mounting plate 2 to the mounting block 1.

As shown in FIGS. 1–3A, the first and second gaskets 4, 5 are fastened between the pipes 22, 23 and the mounting block 1, so that the first and second gaskets 4, 5 are disposed between the recessed portions 35, 36 of the pipes 22, 23 and inner walls of the mounting block 1 defining the through holes 37, 38. The first gasket 4 is disposed on an atmospheric-air side between the pipes 22, 23 and the mounting block 1. The second gasket 5 is disposed on a refrigerant side between the pipes 22, 23 and the mounting block 1. Further, the first gasket 4 has a gas permeability lower than that of the second gasket 5, and has a blistering-resistance which is inferior to that of the second gasket 5. That is, the first gasket 4 restricts liquid or gas refrigerant from passing therethrough more than the second gasket 5, but forms clacks and blisters therein more readily than the second gasket 5 when a pressure of refrigerant changes.

In the first embodiment, the first and second gaskets 4, 5 are O-rings made of elastic thermosetting rubber or thermoplastic rubber such as fluoro rubber, butyl rubber, hydrogenated nitrile rubber, chloroprene rubber, chlorosulfonated rubber, urethane rubber, epichlorohydrin rubber, polysulfide rubber, ethylene propylene rubber, silicone rubber and acrylic rubber. The first and second gaskets 4, 5 may be made of a compound of two or more of the above-mentioned rubbers.

According to the first embodiment, the first gasket 4 having a gas permeability lower than that of the second gasket 5 and having a blistering-resistance inferior to that of the second gasket 5 is disposed on the atmospheric-air side between the pipes 22, 23 and the mounting block 1. The second gasket 5 having a gas permeability higher than that of the first gasket 4 and having a blistering-resistance superior to that of the first gasket 4 is disposed on the refrigerant side between the pipes 22, 23 and the mounting block 1. Since the first gasket 4 has a lower gas permeability, refrigerant is restricted from passing through the first gasket 4 and is restricted from leaking into atmospheric air. Further, when an amount of gas passing through the first gasket 4 is P1 and an amount of gas passing through the second gasket 5 is P2, a pressure of refrigerant gas between the first and second gaskets 4, 5 is decreased by a ratio of P2(P1+P2) with respect to a pressure of refrigerant gas on the refrigerant side of the second gasket 5. Therefore, an amount of refrigerant gas passing through the first gasket 4 is further reduced, and refrigerant is further restricted from leaking into atmospheric air.

Further, since the second gasket 5 has a blistering-resistance superior to that of the first gasket 4, the second gasket 5 does not form a blister therein even when the pressure of refrigerant gas on the refrigerant side of the second gasket 5 is rapidly decreased. Also, even when the pressure of refrigerant gas on the refrigerant side of the second gasket 5 is rapidly decreased, the pressure of refrigerant gas between the first and second gaskets 4, 5 is not rapidly changed, therefore a blister is not formed in the first gasket 4. As a result, refrigerant is sufficiently restricted from leaking into atmospheric air from the pipe joint 20, while a blister is restricted from being formed in the first and second gaskets 4, 5.

Preferably, the first gasket 4 is made of fluoro rubber while the second gasket 5 is made of hydrogenated nitrile rubber or ethylene propylene rubber. Also preferably, the first gasket 4 is made of hydrogenated nitrile rubber while the second gasket 5 is made of ethylene propylene rubber. Also preferably, the first gasket 4 is made of butyl rubber while the second gasket 5 is made of hydrogenated nitrile rubber or ethylene propylene rubber. As a result, the effect of the present invention is improved. Further, the first and second gaskets 4, 5 may be made of the same polymer provided that the first and second gaskets 4, 5 are made different from each other in a gas permeability and a blistering-resistance by adding filler, cross-linking agent or the like to the first and second gaskets 4, 5.

Figure 3A:
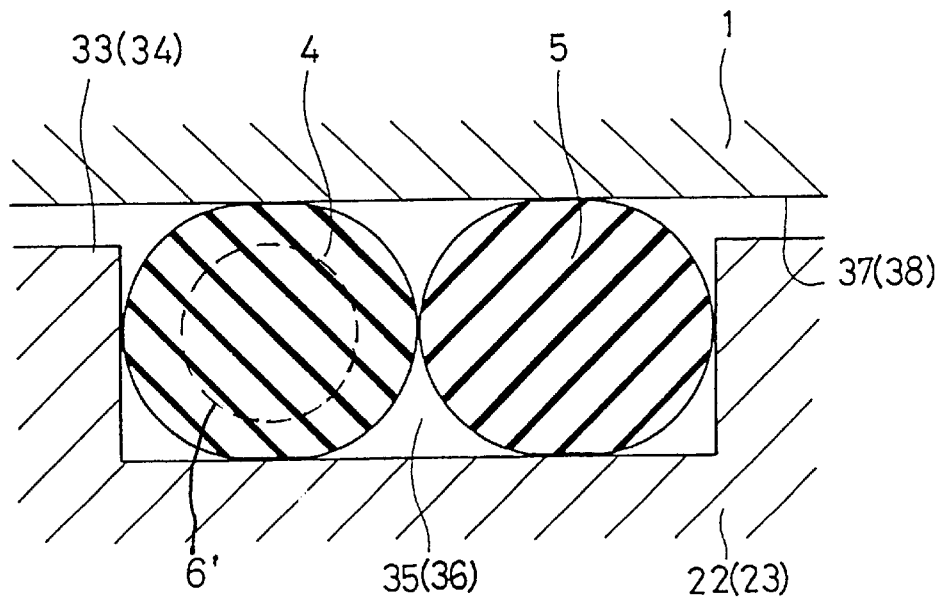
FIG. 3A is a sectional view showing first and second gaskets in the pipe joint according to the first embodiment.
Figure 3B:
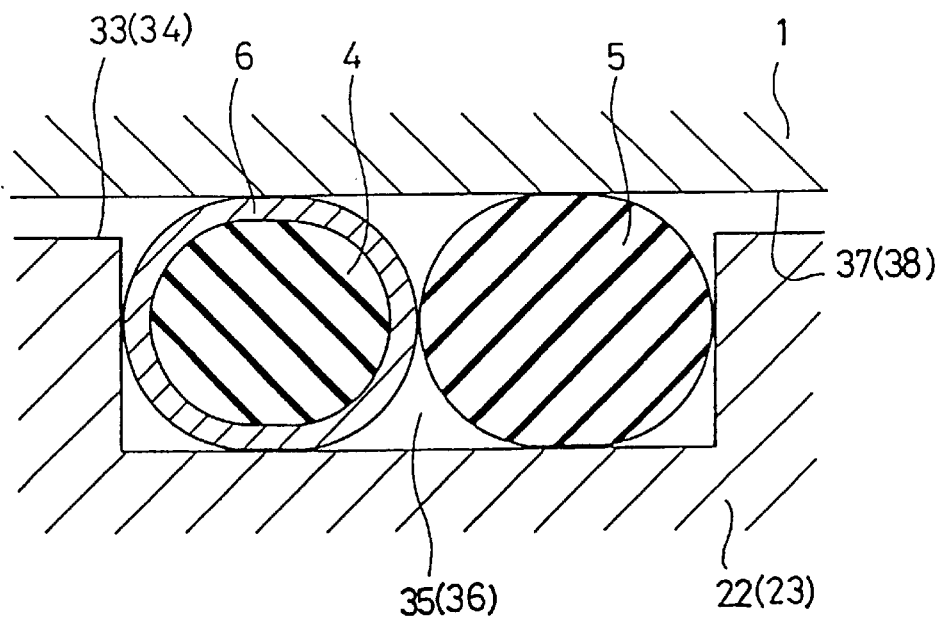
FIG. 3B is a sectional view showing the first and second gaskets in the pipe joint according to a modification of the first embodiment.

As shown in FIG. 3B, a surface of the first gasket 4 may be covered by a covering member 6 which has a gas permeability lower than that of the first gasket 4. Alternately, a surface layer of the first gasket 4 may be deformed to have a gas permeability lower than that of the first gasket 4. As a result, the gas permeability of the first gasket 4 is further lowered. Also, since the covering member 6 or the surface layer of the first gasket 4 readily peels off from a boundary thereof, the blistering-resistance of the first gasket 4 is worsened.

The covering member 6 may be made of metal such as gold, silver and aluminum or resin such as fluoro resin and urethane resin. The covering member 6 may be made of any other material as long as the gas permeability of the first gasket 4 is lowered and the blistering-resistance of the first gasket 4 is worsened by the covering member 6. The covering member 6 may be attached to the first gasket 4 by application, plating, deposition, adhesion and so on. The surface layer of the first gasket 4 may be deformed by halogenation, surface-hardening and so on.

Figure 3C:
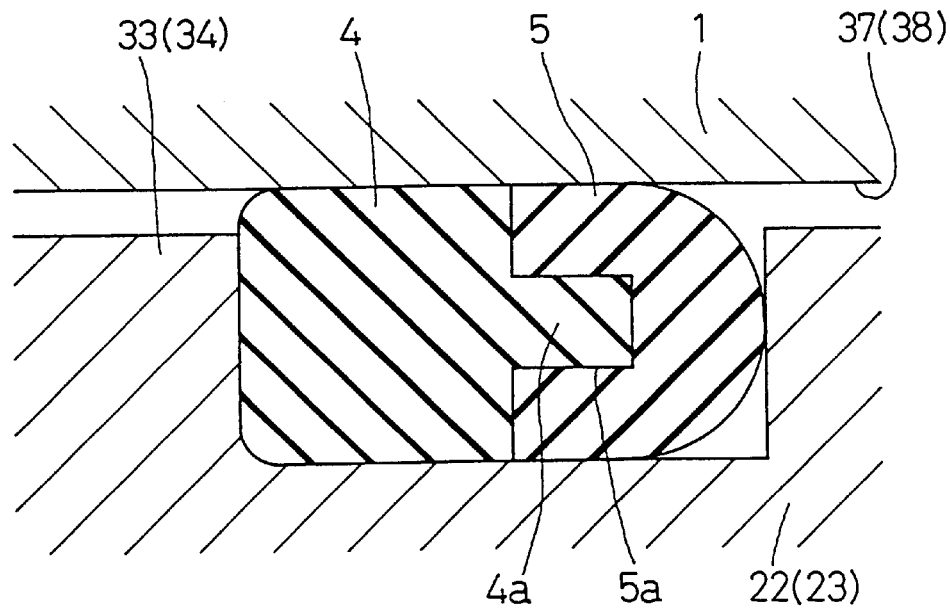
FIG. 3C is a sectional view showing the first and second gaskets in the pipe joint according to a modification of the first embodiment.
Figure 3D:
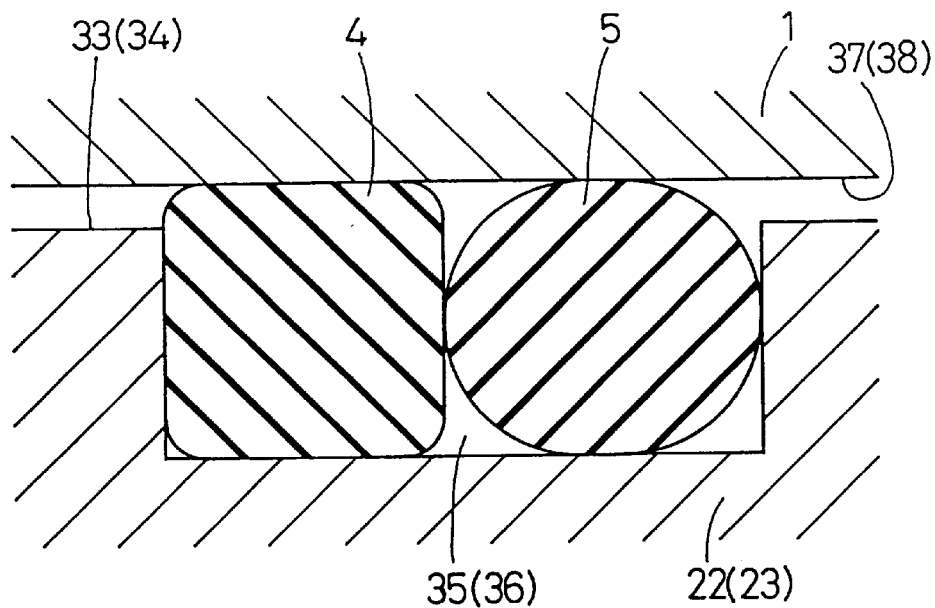
FIG. 3D is a sectional view showing the first and second gaskets in the pipe joint according to a modification of the first embodiment.

As shown in FIG. 3C, the first gasket 4 may have a protrusion 4a while the second gasket 5 has a recess 5a. The first and second gaskets 4, 5 are integrally assembled together by engaging the protrusion 4a with the recess 5a before being mounted on the pipes 22, 23. As a result, a mountability of the first and second gaskets 4, 5 to the pipes 22, 23 is improved. The second gasket 5 may have a protrusion while the first gasket 4 has a recess. Also, as shown in FIG. 3D, the first gasket 4 may have a rectangular cross-section. As a result, even when a pressure of refrigerant gas on the refrigerant gas side of the second gasket 5 is increased, the second gasket 5 is restricted from being locally deformed in an axial direction thereof.

(Second Embodiment)

A second preferred embodiment of the present invention will be described with reference to FIGS. 4 and 5. In this and following embodiments, components which are substantially the same as those in previous embodiments are assigned the same reference numerals.

Figure 4:
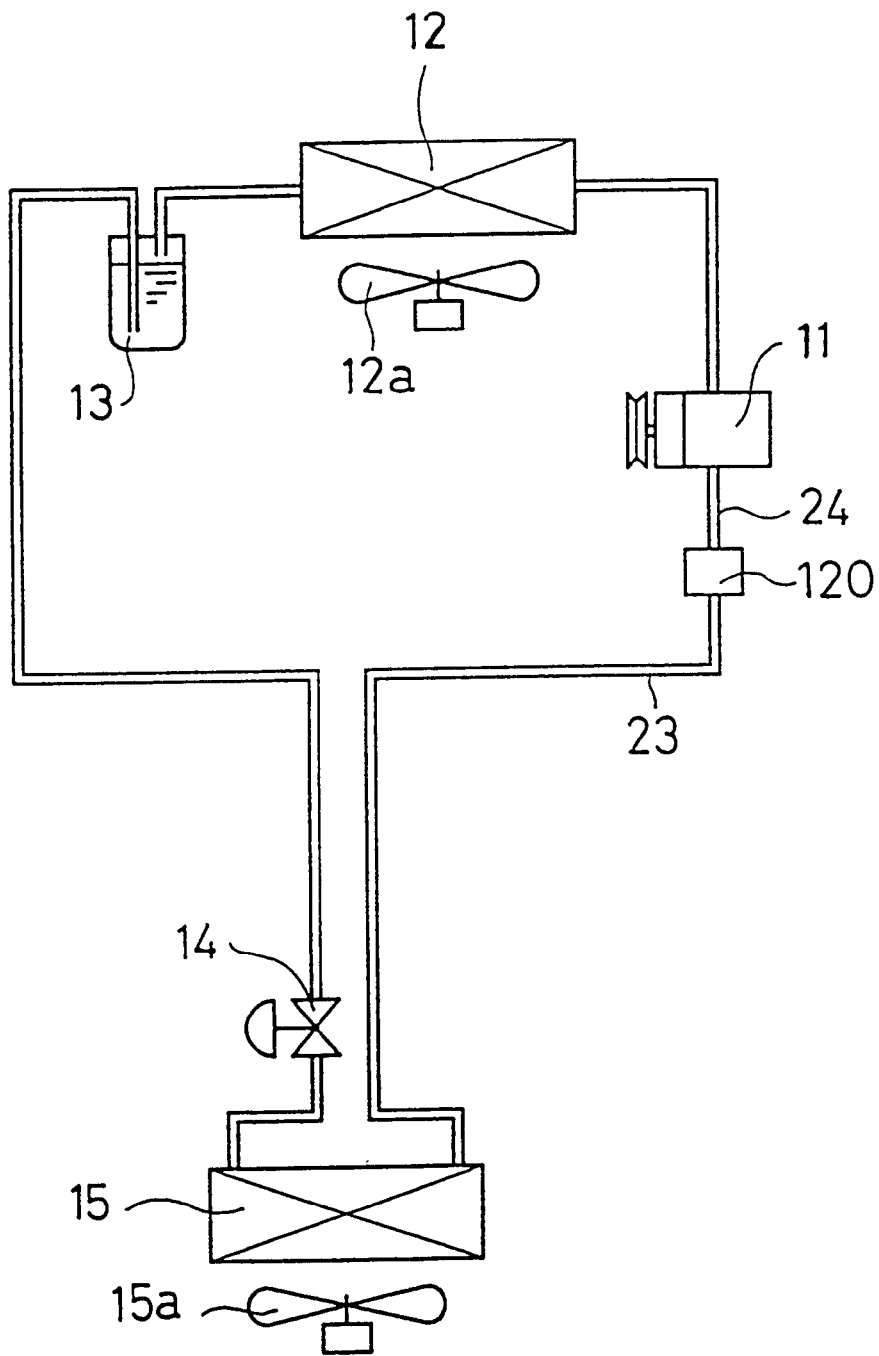
FIG. 4 is a schematic view showing a refrigeration cycle according to a second preferred embodiment of the present invention.
Figure 5:
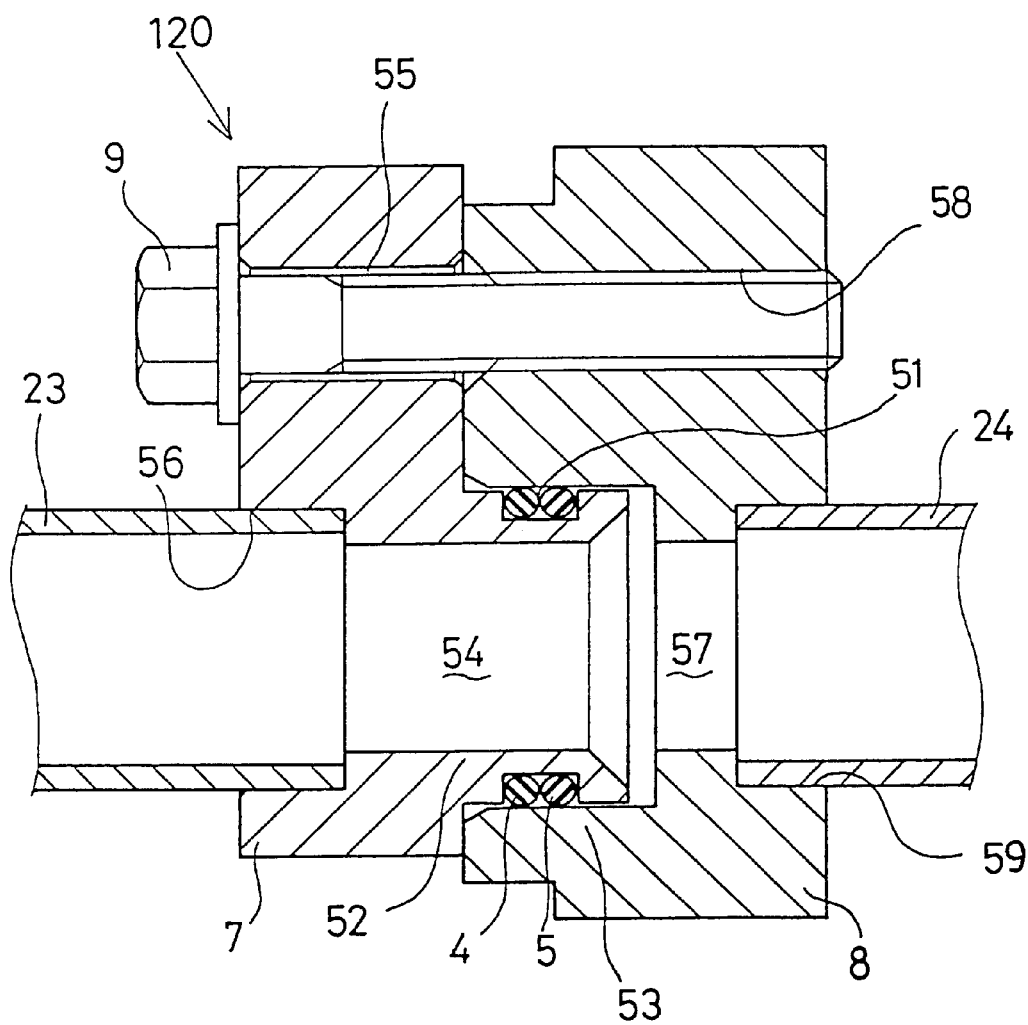
FIG. 5 is a sectional view showing a pipe joint of the refrigeration cycle according to the second embodiment.

In the second embodiment, as shown in FIG. 4, a pipe joint 120 is mounted in a hole formed in the dashboard 19, and connects the pipe 23 and the pipe 24 in series. The outlet of the evaporator 15 is connected to the inlet of the compressor 11 through the pipes 23, 24. As shown in FIG. 5, the pipe joint 120 has the first and second gaskets 4, 5, a male block 7, a female block 8 and a fastening bolt 9. The male block 7 has a protruding sealing portion 52 formed into a cylindrical shape and protruding from a surface of the male block 7 contacting the female block 8 toward the female block 8. The protruding sealing portion 52 has an annular recessed portion 51 formed a long an outer circumferential surface of the protruding sealing portion 52. The first and second gaskets 4, 5 are mounted in the recessed portion 51.

The male block 7 has through holes 54, 55. An end of the pipe 23 is inserted into the through hole 54 so that refrigerant gas flows through the through hole 54. An annular engaging groove 56 is formed at one end (i.e., left end in FIG. 5) of the through hole 54, and the end of the pipe 23 is fit and welded to the engaging groove 56.

The female block 8 has a recessed sealing portion 53. The male block 7 and the female block 8 are connected with each other by engaging the protruding sealing portion 52 with the recessed sealing portion 53. The female block 8 has a through hole 57 and a threaded hole 58. The fastening bolt 9 is inserted through the through hole 55 and is screwed into the threaded hole 58, thereby fastening the male block 7 to the female block 8. An end of the pipe 24 is inserted into the through hole 57 so that refrigerant gas flows through the through hole 57. The through hole 57 has an annular engaging groove 59 at one end (i.e., right end in FIG. 5) thereof, and the end of the pipe 24 is fit and welded to the engaging groove 59.

The first and second gaskets 4, 5 are disposed between the recessed portion 51 and an inner wall of the female block 8 defining the recessed sealing portion 53 to be secured to the male block 7 and the female block 8. The first gasket 4 is disposed on an atmospheric-air side and the second gasket 5 is disposed on a refrigerant side between the protruding sealing portion 52 and the recessed sealing portion 53. According to the second embodiment, the same effect as in the first embodiment is obtained.

(Third Embodiment)

A third preferred embodiment of the present invention will be described with reference to FIG. 6. In the third embodiment, the present invention is applied to a leakage restriction device for a so-called swash plate compressor 111.

Figure 6:
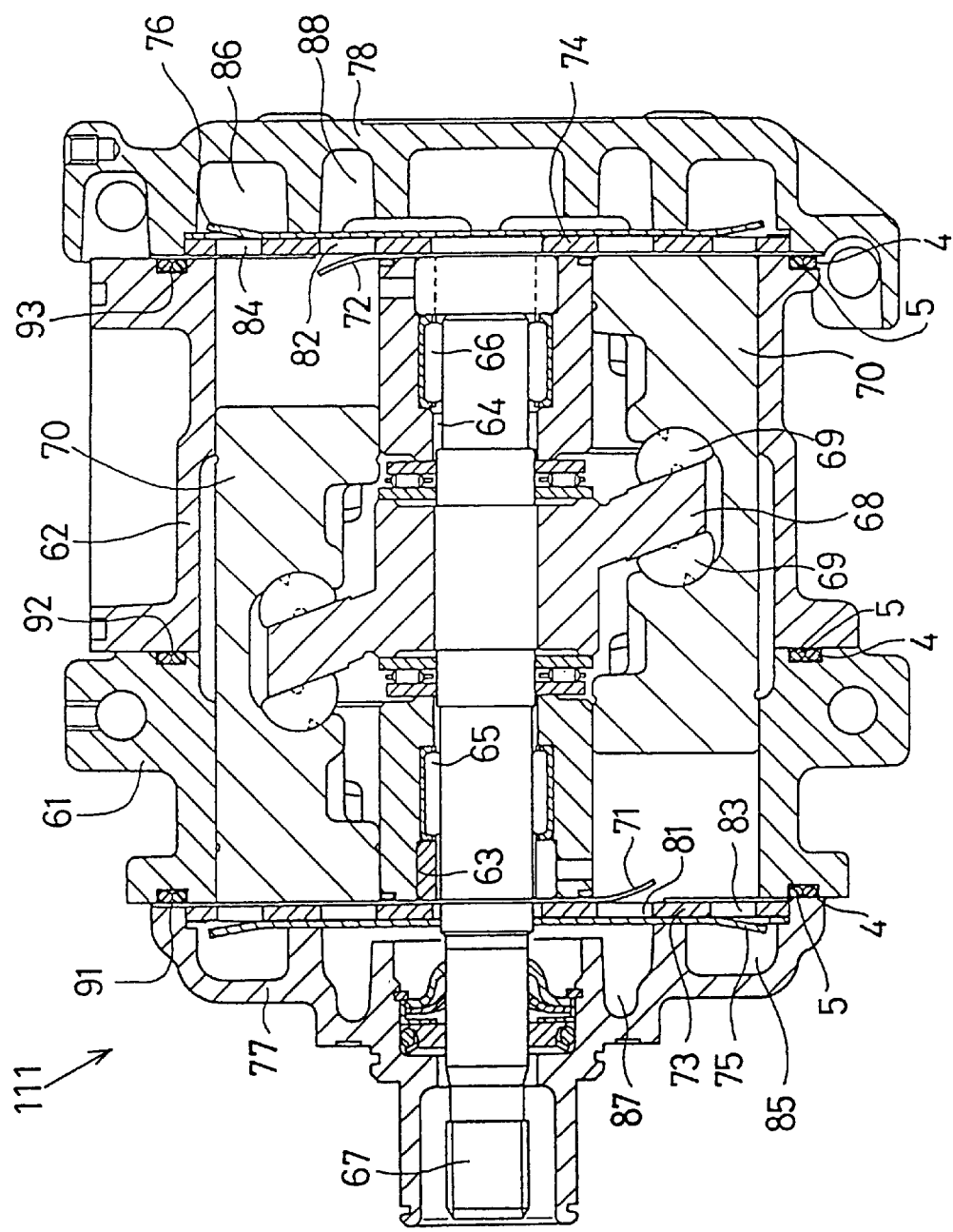
FIG. 6 is a sectional view showing a compressor according to a third preferred embodiment of the present invention.

As shown in FIG. 6, the compressor 111 has a shaft 67, a swash plate 68, a pair of pistons 70 and first, second and third leakage restriction devices for preventing refrigerant flowing in the compressor 111 from leaking into atmospheric air. The shaft 67 is rotatably held in shaft holes 63, 64 formed in cylinder housings 61, 62 through radial bearings 65, 66. The swash plate 68 is mounted on an outer circumferential surface of the shaft 67 to be inclined and is rotated integrally with the shaft 67. The pistons 70 are mounted on the swash plate 68 through plural hemispherical shoes 69. When the swash plate 68 is rotated, the pistons 70 reciprocate within the cylinder housings 61, 62 to compress refrigerant.

An inlet valve 71, a valve plate 73, and an outlet valve 75 are attached in this order to a left end surface of the cylinder housing 61 in FIG. 6. Similarly, an inlet valve 72, a valve plate 74 and an outlet valve 76 are attached in this order to a right end surface of the cylinder housing 62 in FIG. 6. The cylinder housings 61, 62 are held between a front housing 77 and a rear housing 78. The valve plate 73 has an inlet hole 81 opened and closed by the inlet valve 71 and an outlet hole 83 opened and closed by the outlet valve 75. The valve plate 74 has an inlet hole 82 opened and closed by the inlet valve 72 and an outlet hole 84 opened and closed by the outlet valve 76.

The front housing 77 and the rear housing 78 are respectively fastened to the cylinder housings 61, 62 through plural through bolts (not shown) at peripheral portions thereof. The front and rear housings 77, 78 respectively have outlet rooms 85, 86 communicating with an outlet port (not shown) of the compressor 111 and inlet rooms 87, 88 communicating with an inlet port (not shown) of the compressor 111.

The first leakage restriction device includes the first and second gaskets 4, 5 disposed between an annular sealing portion formed at the peripheral portion of the front housing 77 and an annular recessed portion 91 formed at a peripheral portion of the left end surface of the cylinder housing 61 in FIG. 6. The second leakage restriction device includes the first and second gaskets 4, 5 disposed between an annular recessed portion 92 formed at a peripheral portion of a right end surface of the cylinder housing 61 in FIG. 6 and an annular sealing portion formed at a peripheral portion of a left end surface of the cylinder housing 62 in FIG. 6. The third leakage restriction device includes the first and second gaskets 4, 5 disposed between an annular recessed portion 93 formed at a peripheral portion of the right end surface of the cylinder housing 62 in FIG. 6 and an annular sealing portion formed at the peripheral portion of the rear housing 78.

The first gasket 4 is disposed on an atmospheric-air side and the second gasket 5 is disposed on a refrigerant side in each of the recessed portions 91, 92 and 93. According to the third embodiment, the same effect as in the first embodiment is obtained.

(Fourth Embodiment)

Figure 7:
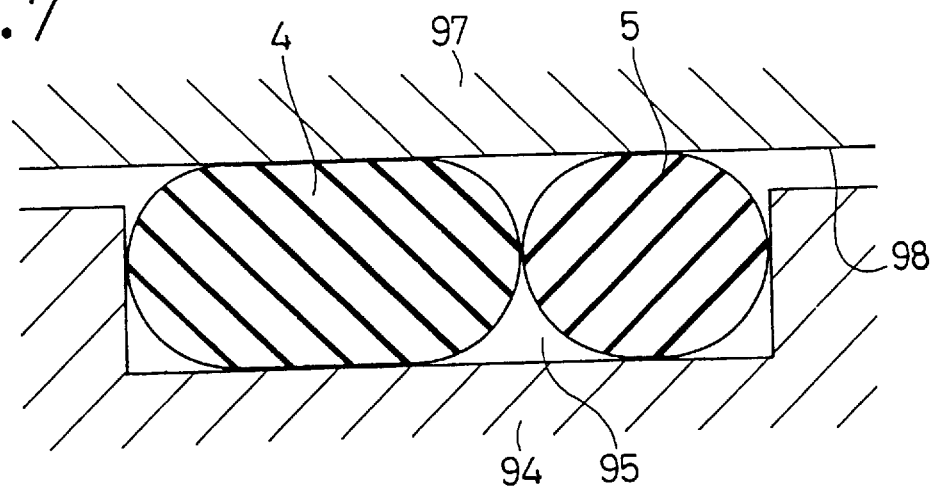
FIG. 7 is a sectional view showing first and second gaskets between first and second members of a refrigeration cycle according to a fourth preferred embodiment of the present invention.

A fourth preferred embodiment of the present invention will be described with reference to FIG. 7.

In the fourth embodiment, a refrigeration cycle has a first member 94 and a second member 97. The first member 94 has a sealing surface having an annular recessed portion 95. The second member 97 has a sealing surface 98 contacting the sealing surface of the first member 94. The first and second gaskets 4, 5 are disposed between the recessed portion 95 and the sealing surface 98. The first gasket 4 is disposed on an atmospheric-air side and the second gasket 5 is disposed on a refrigerant side in the recessed portion 95. A thickness of the first gasket 4 in an axial direction thereof (i.e., right-left direction in FIG. 7) is set larger than that of the second gasket 5. Therefore, a cross-sectional area of the first gasket 4 becomes larger than that of the second gasket 5.

According to the fourth embodiment, a length of a gas flow passage in the first gasket 4 is increased. Therefore, the gas permeability of the first gasket 4 is further lowered, thereby further restricting refrigerant gas from leaking into atmospheric air. Further, a length of a gas flow passage in the second gasket 5 is smaller than that of the first gasket 4. Therefore, refrigerant gas is readily drained from the second gasket 5 in comparison with the first gasket 4, thereby further improving the blistering-resistance of the second gasket 5.

(Fifth Embodiment)

Figure 8:
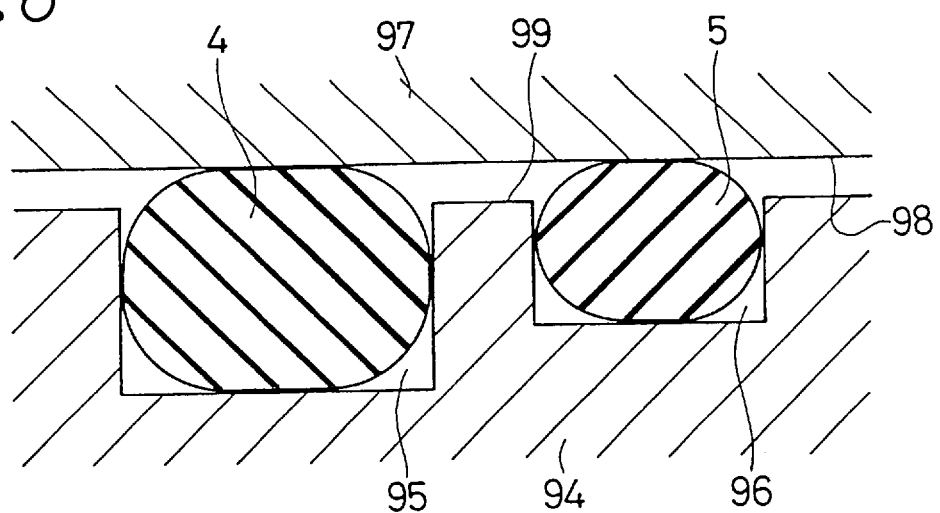
FIG. 8 is a sectional view showing first and second gaskets between first and second members of a refrigeration cycle according to a fifth preferred embodiment of the present invention.

A fifth preferred embodiment of the present invention will be described with reference to FIG. 8.

In the fifth embodiment, the sealing surface of the first member 94 has annular recessed portions 95, 96 and a partition wall 99 formed between the recessed portions 95, 96 to separate the recessed portions 95, 96 from each other. The first gasket 4 is disposed between the recessed portion 95 and the sealing surface 98 of the second member 97. The second gasket 5 is disposed between the recessed portion 96 and the sealing surface 98. The recessed portion 95 is formed on an atmospheric-air side and the recessed portion 96 is formed on a refrigerant side between the first and second members 94, 97. Therefore, the first gasket 4 is disposed on the atmospheric air side and the second gasket 5 is disposed on the refrigerant side. A length of the recessed portion 96 in an axial direction of the first and second gaskets 4, 5 is smaller than that of the recessed portion 95. A depth of the recessed portion 96 from the sealing surface of the first member 94 is smaller than that of the recessed portion 95. Therefore, the second gasket 5 has a cross-sectional area smaller than that of the first gasket 4.

According to the fifth embodiment, since the cross-sectional area of the second gasket 5 is smaller than that of the first gasket 4, refrigerant gas is more readily drained from the second gasket 5 in comparison with the first gasket 4. Therefore, the blistering-resistance of the second gasket 5 is further improved. Further, the first gasket 4 has a cross-sectional area larger than that of the second gasket 5 and has a thickness in an axial direction thereof larger than that of the second gasket 5. Therefore, the gas permeability of the first gasket 4 is further lowered, and refrigerant gas is further restricted from leaking into atmospheric air.

(Sixth Embodiment)

Figure 9:
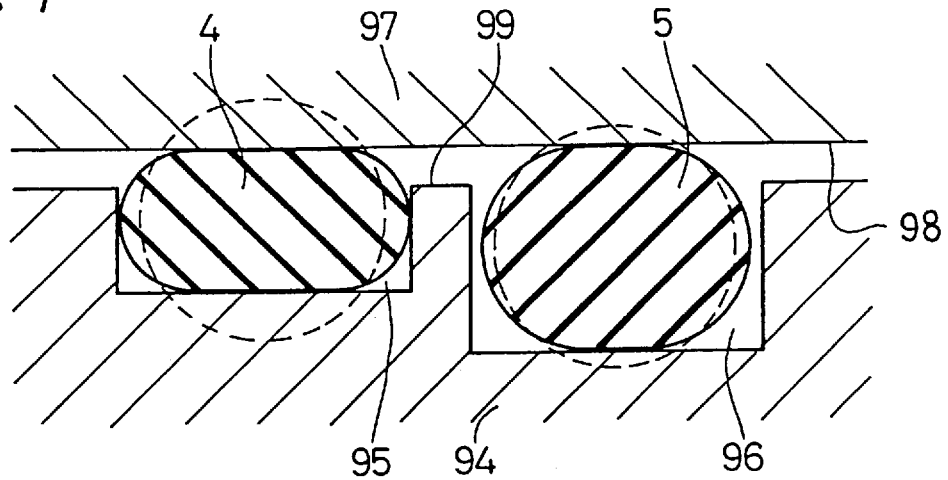
FIG. 9 is a sectional view showing first and second gaskets between first and second members of a refrigeration cycle according to a sixth preferred embodiment of the present invention.

A sixth preferred embodiment of the present invention will be described with reference to FIG. 9.

In the sixth embodiment, the recessed portion 96 has a depth from the sealing surface larger than that of the recessed portion 95. The first and second gaskets 4, 5 are formed to have the substantially same cross-sectional area. Therefore, when the first and second gaskets 4, 5 are respectively disposed between the recessed portions 95, 96 and the sealing surface 98, the first gasket 4 is more tightly clamped than the second gasket 5 to increase a density of molecules in the first gasket 4. As a result, the gas permeability of the first gasket 4 is further lowered. Further, since the second gasket 5 has a smaller density of molecules than that of the first gasket 4, internal distortion of the second gasket 5 due to compressing stress and expansion stress applied to the second gasket 5 is decreased. Therefore, the blistering-resistance of the second gasket 5 is further improved.

In the above-mentioned embodiments, an embedded member 6' made of a material having a gas permeability lower than that of the first gasket 4 may be embedded in the first gasket 4 as shown in phantom in FIG. 3A. As a result, the gas permeability of the first gasket 4 is further lowered, and the first gasket 4 further restricts gas from leaking into atmospheric air. Also, the first gasket 4 readily peels off at a boundary between the embedded member and the first gasket 4 due to difference in material. Therefore, the blistering-resistance of the first gasket 4 is worsened. The embedded member may be made of metal such as aluminum, resin such as fluoro resin and polyamide resin, rubber such as fluoro rubber, butyl rubber and hydrogenated nitrile rubber and so on.

The present invention may be applied to a leakage restriction device disposed in any pipe joint which connects any two of the condenser 12, the separator 13, the expansion valve 14, the evaporator 15 or the like in the refrigeration cycle 10. Further, sealing in the present invention may be performed by a cylindrical face sealing method, an end-face sealing method and so on. Also, the present invention may be applied to a leakage restriction device for a vehicle cooler, a vehicle refrigerator, a vehicle freezer, a house air conditioner, a store air conditioner and a factory air conditioner.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A leakage restriction device for a refrigeration cycle through which a refrigerant flows, the refrigeration cycle having a pipe connection portion at which refrigerant pipes are connected, the pipe connection portion being disposed in air, the leakage restriction device comprising:
   a first leakage restriction member disposed on an air side in the pipe connection portion for restricting the refrigerant from leaking into the air;
   a second leakage restriction member disposed on a refrigerant side in the pipe connection portion for restricting the refrigerant from leaking into the air, wherein:
       the first leakage restriction member has a gas permeability lower than that of the second leakage restriction member;
       the first leakage restriction member has a blistering-resistance which is inferior to that of the second leakage restriction member; and
       a surface of the first leakage restriction member is deformed to have a gas permeability lower than that of the first leakage restriction member.

2. The leakage restriction device according to claim 1, wherein a thickness of the first leakage restriction member is larger than that of the second leakage restriction member.

3. The leakage restriction device according to claim 1, wherein a cross-sectional area of the first leakage restriction member is larger than that of the second leakage restriction member.

4. The leakage restriction device according to claim 1, wherein the first leakage restriction member is more tightly clamped in the pipe connection portion than the second leakage restriction member.

5. The leakage restriction device according to claim 1, wherein:
   the first leakage restriction member is made of a first material; and
   the second leakage restriction member is made of a second material having a gas permeability higher than that of the first material, and having a blisteringresistance which is superior to that of the first material.

6. The leakage restriction device according to claim 1, wherein the first and second leakage restriction members are made of rubber.

7. A leakage restriction device for a refrigeration cycle through which a refrigerant flows, the refrigeration cycle having a pipe connection portion at which refrigerant pipes are connected, the pipe connection portion being disposed in air, the leakage restriction device comprising:
   a first leakage restriction member disposed on an air side in the pipe connection portion for restricting the refrigerant from leaking into the air; and
   a covering member which covers a surface of the first leakage restriction member; wherein:
       the first leakage restriction member has a gas permeability lower than that of the second leakage restriction member;
       the first leakage restriction member has a blistering-resistance which is inferior to that of the second leakage restriction member;
       the first leakage restriction member is made of a first material; and
       the covering member is made of a third material having a gas permeability lower than that of the first material.

8. A leakage restriction device for a refrigeration cycle through which a refrigerant flows, the refrigeration cycle having a pipe connection portion at which refrigerant pipes are connected, the pipe connection portion being disposed in air, the leakage restriction device comprising:
   a first leakage restriction member disposed on an air side in the pipe connection portion for restricting the refrigerant from leaking into the air; and
   an embedded member embedded in the first leakage restriction member and made of a fourth material; wherein:
       the first leakage restriction member has a gas permeability lower than that of the second leakage restriction member;
       the first leakage restriction member has a blistering-resistance which is inferior to that of the second leakage restriction member;
       the first leakage restriction member is made of a first material; and
       the fourth material has a gas permeability lower than that of the first material.

9. A refrigeration cycle through which a refrigerant flows, the refrigeration cycle comprising:
   a pipe connector disposed in an air;
   a plurality of pipes through which the refrigerant flows, the pipes being connected at the pipe connector;
   a first leakage restriction member disposed on an air side in the pipe connector for restricting the refrigerant from leaking into the air;
   a second leakage restriction member disposed on a refrigerant side in the pipe connector for restricting the refrigerant from leaking into the air; and
   a covering member which covers a surface of the first leakage restriction member; wherein:
       the first leakage restriction member has a gas permeability lower than that of the second leakage restriction member;
       the first leakage restriction member has a blistering-resistance which is inferior to that of the second leakage restriction member;
       the first leakage restriction member is made of a first material; and
       the covering member is made of a third material having a gas permeability lower than that of the first material.

10. The refrigeration cycle according to claim 9, wherein:
the pipe connector has a hole;
at least one of the pipes is inserted into the hole; and
the first leakage restriction member and the second leakage restriction member are disposed between an inner wall of the pipe connector defining the hole and an outer wall of the at least one of the pipes.

11. The refrigeration cycle according to claim 9, wherein:

the pipe connector includes a first connector member having a protrusion and a second connector member having a recess;

the protrusion is engaged with the recess thereby connecting the first connector member and the second connector member; and the first leakage restriction member and the second leakage restriction member are disposed between an outer wall of the protrusion and an inner wall of the second connector member defining the recess.

12. The leakage restriction device according to claim 9, further comprising an embedded member embedded in the first leakage restriction member and made of a fourth material; wherein:

the first leakage restriction member is made of a first material; and the fourth material has a gas permeability lower than that of the first material.

13. A refrigeration cycle through which a refrigerant flows, the refrigeration cycle comprising:

a pipe connector disposed in an air;

a plurality of pipes through which the refrigerant flows, the pipes being connected at the pipe connector;

a first leakage restriction member disposed on an air side in the pipe connector for restricting the refrigerant from leaking into the air;

a second leakage restriction member disposed on a refrigerant side in the pipe connector for restricting the refrigerant from leaking into the air; wherein:

the first leakage restriction member has a gas permeability lower than that of the second leakage restriction member;

the first leakage restriction member has a blistering-resistance which is inferior to that of the second leakage restriction member; and a surface of the first leakage restriction member is deformed to have a gas permeability lower than that of the first leakage restriction member.

* * * * *